United States Patent [19]

Levan

[11] Patent Number: 4,985,754

[45] Date of Patent: Jan. 15, 1991

[54] HIGH INDEX COLOR ENCODING SYSTEM

[76] Inventor: William C. Levan, 1567 Clarita Ave., San Jose, Calif. 95130

[21] Appl. No.: 309,284

[22] Filed: Feb. 10, 1989

[51] Int. Cl.$^5$ .......................................... H04N 9/65
[52] U.S. Cl. ........................................................ 358/23
[58] Field of Search ................................. 358/23, 16

[56] References Cited

U.S. PATENT DOCUMENTS

| 3,732,360 | 5/1973 | Breimer et al. | 358/37 |
| 4,402,006 | 8/1983 | Karlock | 358/37 |

FOREIGN PATENT DOCUMENTS

89088  5/1984  Japan ..................................... 358/12

*Primary Examiner*—John W. Shepperd
*Attorney, Agent, or Firm*—Michael J. Hughes

[57] ABSTRACT

A high index color encoding system (10) is provided for the purpose of receiving RGB video input from a personal computer or similar device and generating video signals in other formats for use by conventional video equipment. The color encoding system (10) includes operational circuitry (30) adapted to shape and modify the chrominance portions of the signals at a relatively high carrier frequency of four times the NTSC standard frequency with the lower NTSC output carrier being reconstituted by a doubly balanced mixer (266) component, thus substantially improving signal quality. The operational circuitry further includes synchronization generation circuitry (148), a Y, I, Q matrix (66) for creating luminance and chrominance components from RGB signals, an I, Q modulator (96) for producing high quality chrominance output and a dynamic aperture (246) for enhancing the rise slope of the luminance signal, among other components. Various available video outputs to the system (10) are user selectable and user adjustable for compatibility with desired end use equipment and formats. The primary expected uses of the system are in graphics generation applications, utilization of conventional video equipment for computer video display and in memorialization of computer display sequences.

20 Claims, 6 Drawing Sheets

HIGH INDEX COLOR ENCODING SYSTEM

TECHNICAL FIELD

The present invention relates generally to video and television apparatus, and more particularly to signal encoding systems relating to RGB input signals.

BACKGROUND ART

Numerous methods exist for creating, transmitting and translating electrical signals corresponding to visual images. These methods of creating and manipulating video signals have, over the years, been developed in order to correspond with technology for electronically capturing visual images and reproducing them at another site or in a different medium. A variety of different standards have been created in order to achieve some predictability in this field, but these standards differ widely throughout the world due to differences in equipment and historical perspective. Color signals are considerably more complex than black/white and produce additional complications.

One result of the variety of different signal encoding and processing systems and standards has been the necessity for devices to translate a given signal from one signal scheme to another without substantial loss of resulting picture quality. Some examples of various methods and devices which have been utilized for this purpose are illustrated in U.S. Pat. Nos. 3,946,432, issued to A. Goldberg et al.; 4,266,241, issued to B. Hjortzberg: 4,227,204 issued to J. Rossi: 4,739,313, issued to M. Oudshoorn et al.; and 4,766,484 issued to J. Clayton et al.

Although a number of various techniques have been developed for translating certain types of input signals to certain types of outputs there remain gaps in the technology. Various commercial devices exist for translating specific inputs to specific outputs. Devices such as those described in the Oudshoorn et al patent are intended for use in converting a standard composite video signal for display on a computer type monitor which utilizes RGB signals. However, no products or methods are known to the inventor for converting computer generated RGB inputs for encoding for display in a variety of different display signal modes. The present invention is intended to fill that gap.

A common problem encountered in video signal processing apparatus is the degradation of the output signal quality caused by the encoding and decoding processes. The above cited patents, in addition to various commercial devices and techniques, reflect a number of different attempts to maximize the picture quality which can be derived as a result of the video output signal generated thereby. However, due to various inherent difficulties, no completely successful and economically feasible methods have yet been devised.

DISCLOSURE OF THE INVENTION

Accordingly, it is an object of the present invention to provide an economical assembly for encoding RGB video signal input and providing video output signals in a variety of formats, including NTSC standard.

Another object of the present invention is to provide an RGB input encoding device which generates excellent output signal clarity and quality in each output format.

It is a further object of the present invention to minimize or eliminate signal cross talk.

It is yet another object of the present invention to provide a single assembly which is capable of providing simultaneous output to a variety of different end elements.

It is still further object of the present invention to provide a single assembly which is capable of providing simultaneous output to a variety of different end elements.

Briefly, the preferred embodiment of the present invention is a high index coherent color encoding system for RGB video input which is adapted to take video signals generated in an RGB mode and to convert the signals for output to devices requiring other modes of video input signals, such as composite video, Y/C format, and other formats common to NTSC, PAL, VHS, SVHS and other industry standards and formats. The system is particularly well adapted for utilizing computer generated RGB outputs to produce signals usable on a wide variety of devices not normally intended for use with computers.

The preferred embodiment of the color encoding system is an assembly of electronic components arrayed in a particular circuitry pattern for the purpose of modification of input signals so as to produce appropriately modulated output signals of varying configurations and frequencies. The preferred embodiment particularly utilizes a method of modulation of the signals at a frequency substantially higher than that of standard NTSC utilization with, regeneration of the NTSC frequency achieved by a doubly balanced mixer component after the completion of the other signal processing steps. This results in the elimination of cross talking among the signal components during processing, due to the high frequency, and produces a higher quality NTSC output signal. The particular frequency selected for the preferred embodiment of the present invention is 14.318 MHz, or four times the NTSC carrier frequency of 3.579 MHz, which is also 910 times the standard horizontal sync frequency.

An advantage of the present invention is that it permits a single economical device to take input generated in RGB format and provide output to most commercial video devices which may be selected by the end user, thus eliminating the need for a variety of encoding and decoding devices.

Another advantage of the present invention is that the analog dynamic aperture correction approach utilized approximates a perfect square wave and thus results in a sharper output signal.

A further advantage of the present invention is that the use of the higher frequency carrier during modulation permits more efficient filtering and elimination of out of band signal noise.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF THE DRAWINGS

FIG. 2 (parts 2a and 2b) is a schematic illustration of the operational circuitry of the preferred embodiment;

BEST MODE OF CARRYING OUT THE INVENTION

The present invention is a high index coherent color encoding system particularly adapted for encoding RGB video input for output in a variety of different schema. The preferred embodiment of the encoding system is adapted for providing output in NTSC(composite video), Y/C, PAL, 629/688 KHz, and a variety of other output formats. The system is adapted for utilization throughout the world with any color video output of the RGB type, such as the well CGA graphics scheme.

Figure 1:
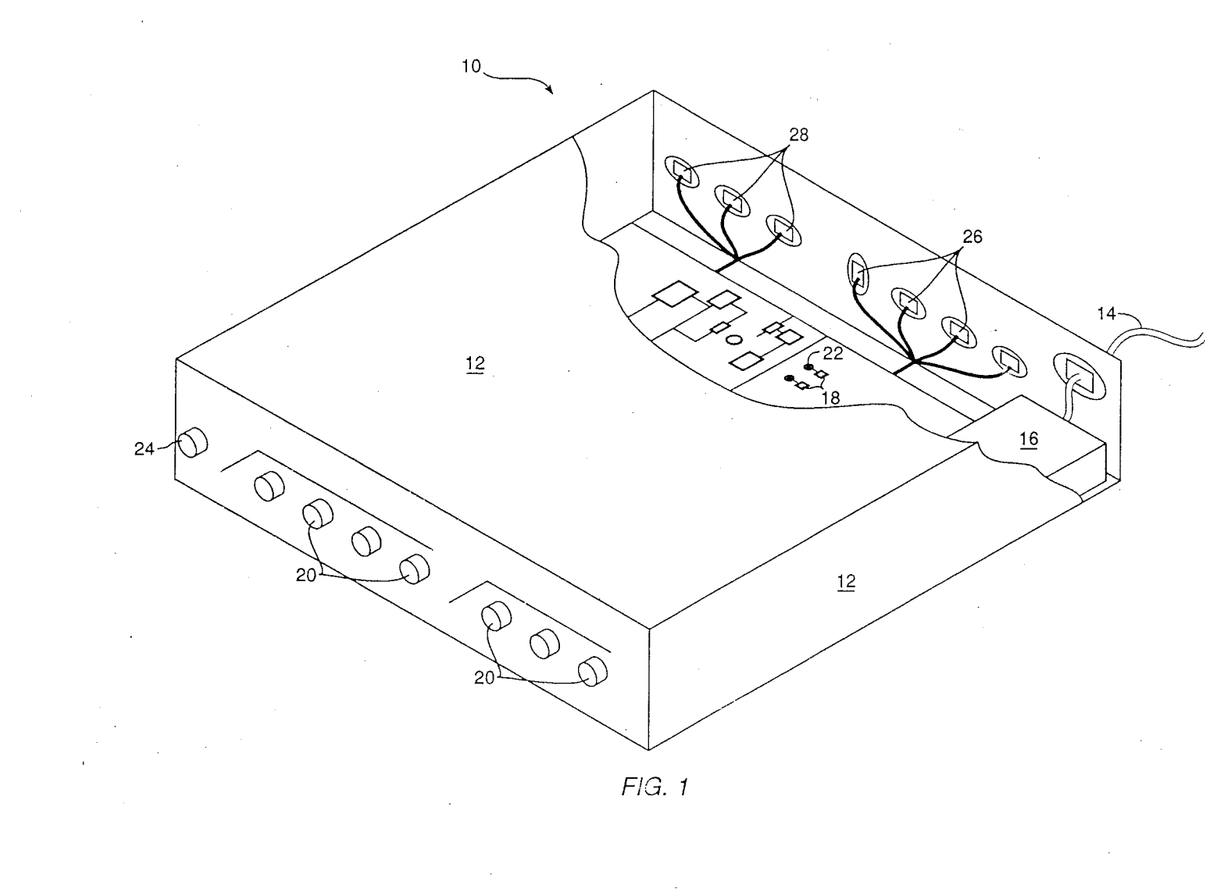
FIG. 1 is a cut-away perspective view of the preferred embodiment of the high index coherent color encoding system of the present invention.

A preferred embodiment of the high index coherent color encoding system of the present invention, shown as expected to be packaged for commercial utilization, is illustrated in a cut-away perspective view in FIG. 1 and is referred to by the general reference character 10. The color encoding system 10 is shown as including a variety of electrical and electronic elements enclosed within a housing 12.

The electrical power for the color encoding system 10 is provided by a AC power cord 14 which is adapted for connection to ordinary wall power. In the United States this will ordinarily be 110 volt 60 cycle AC. The AC power cord 14 connects to an internal power supply 16 which provides DC power to the internal components of the system 10. In the preferred embodiment 10, the internal power supply 16 provides output to the various other components at DC power voltages of +12, +5, −5, and/or −12 volts. Within the housing 12 is situated an array of potentiometers 18. The potentiometers 18 are variously controlled either by external power control knobs 20 situated on the front of the housing 12, where they are accessible to the user, or by internal potentiometer controls 22, which may be factory or technician adjusted to compensate for variations in various circuitry elements from unit to unit. A user selectable LO (Local Oscillator) switch 24 is also provided on the exterior of the housing 12 to permit the user to select the frequency of an alternate, lower frequency chrominance output (VHS versus U-Matic) desired in a given situation.

The exterior of the housing also includes one or more input ports 26 which are connected to a computer or similar device and a plurality of output ports 28 which permit the system 10 to be connected to one or more video output devices.

The input ports 26, the potentiometer array 18, the LO switch 24 and the output ports 28 are all connected to an operational circuitry subassembly 30 which is situated within the housing 12. The primary thrust of the present invention is to be found in the operational circuitry 30. The operational circuitry 30 appropriately modifies the signals received through the input ports 26 and delivers usable output signals to the output ports 28.

Figure 2A:
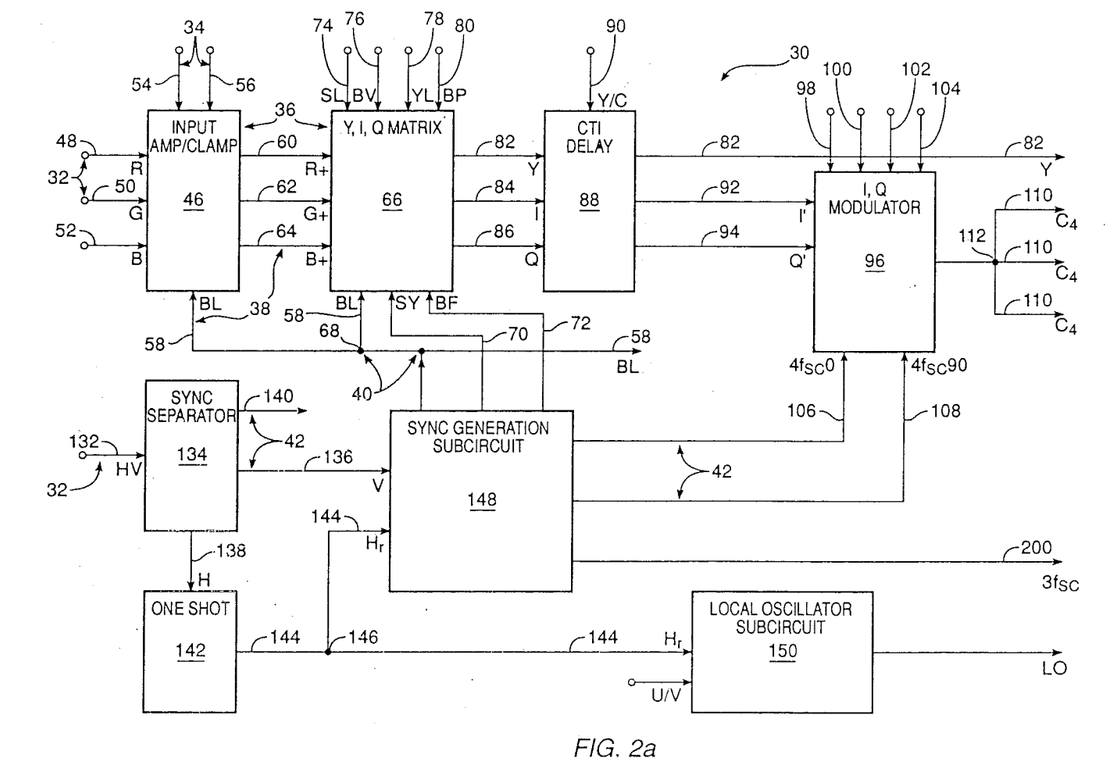
Figure 2B:
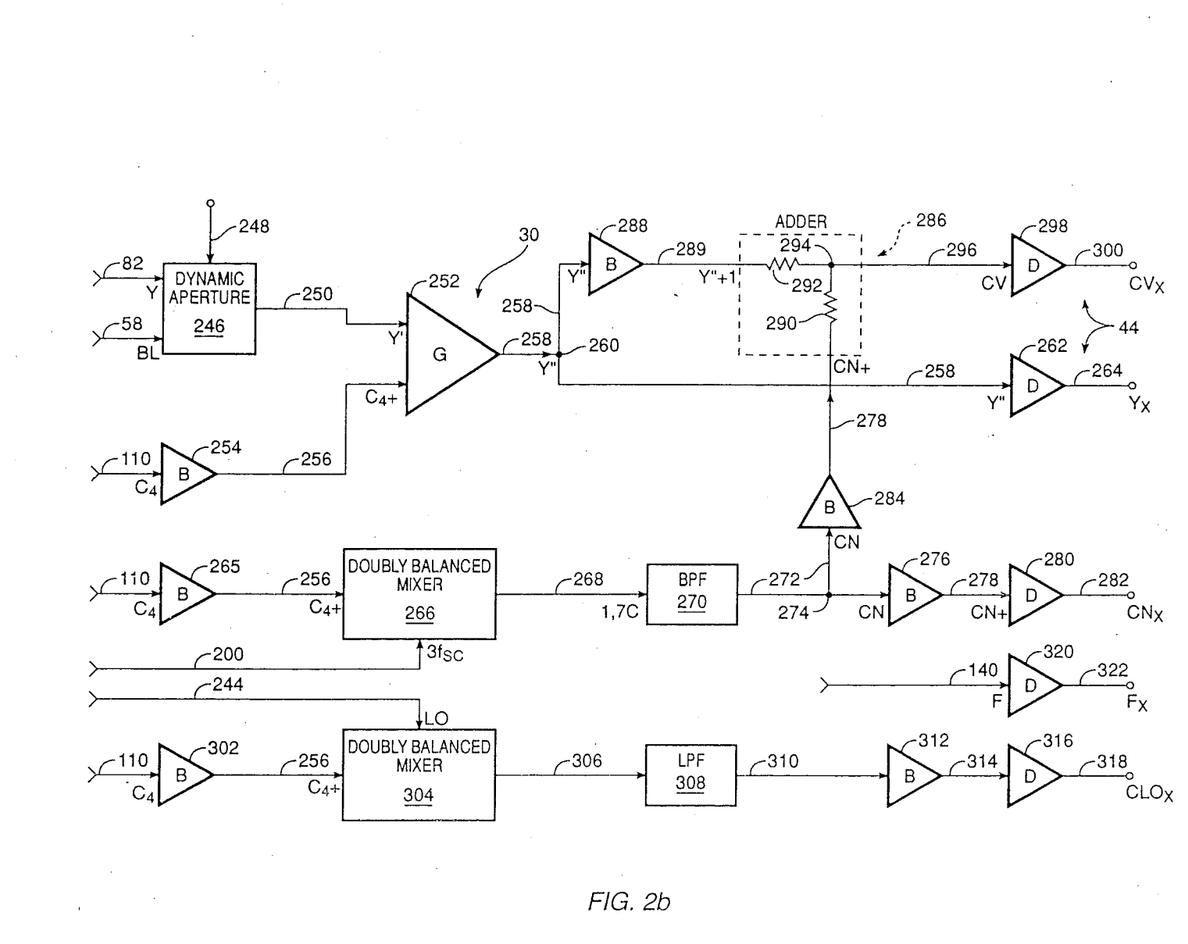

The preferred embodiment of the operational circuitry of the present invention is illustrated in a schematic view in FIG. 2 (broken into FIGS. 2a and 2b for illustration purposes). In this illustration the operational circuitry 30 is illustrated schematically. For the purposes of discussion the circuitry 30 is best understood from a consideration of various signals, signal pathways, and signal modification components. Accordingly, the following discussion will center on the various signal modification components of the invention and how each of them acts upon the various signals translated therebetween.

The operational circuitry 30 of the preferred embodiment is adapted to operate upon a multiplicity of externally generated input signals 32 which are combined with a multiplicity of system-generated input signals 34 and carried to a variety of signal modification elements 36 along electrically conductive pathways 38. The external input signals 32 are received by the system 10 though the input 1 ports 26. The system-generated input signals 34 are adjustable signals derived from the internal power supply 16 and the potentiometer array 18. At various schematic locations within the operational circuitry 30 the conductive pathways 38 intersect at pathway branching junctions 40. Once the external input signals 32 have been acted upon by one or more of the signal modification elements 36 and, in most cases, have been combined with system input signals 34, they are referred to as internal signals 42. When the internal signals 42 have been finally modified to their form for delivery to external devices they are referred to as output signals 44.

With reference to FIG. 2a, the first of the signal modification elements 36 illustrated is an input amplifier/clamp 46 which is adapted to receive external input signals 32 in the nature of an red input R 48, a green input G 50, and a blue input B 52 from the computer or similar RGB output device. The R, G, and B input signals 48, 50 and 52 are typically in the form of amplitude modulated sine wave signals delivered to the input amplifier/clamp 46 over separate conductive pathways 38 from the input ports 26. Depending on the type of input from the RGB signal generating device, these signals may also be in the form of TTL logic signals. The operational circuitry 30 is adapted to successfully operate with either type of input The input amplifier/clamp 46 also receives as input pair of system generated input signals 34 in the nature of an overall gain input 54 and a black level input 56. Both the overall gain system input 54 and the black level gain system input 56 (also known as the clamp level input 56), are user controlled via the potentiometer control knobs 20 associated therewith appearing on the front of the housing 12. These are voltage signals in the form of DC current and are utilized to amplify the voltage of the incoming R,G and B signals 48, 50 and 52 to levels appropriate for utility within the remainder of the operational circuitry 30. The input amplifier/clamp 46 also receives as input an internal signal 42 in the form of a blanking or clamp pulse BL 58. The blanking pulse BL 58 is generated within the synchronization signal generation components which will be discussed hereinafter.

The output of the input amplifier/clamp 46 is in the form of a trio of internal signals 32 which are in the form of amplified versions of the red, green and blue input signals 48, 50 and 52. The internal signals 42 are in the form of an amplified red signal R+ 60, and amplified green signal G+ 62 and an amplified blue signal B+ 64. With the exception of amplification, and DC level the R+, G+ and B+ 60, 62 and 64 are unaltered from the R,G and B signals 48, 50 and 52.

The R+, G+ and B+ signals 60, 62 and 64 are then carried on conductive pathways 38 to a Y, I, Q matrix 66. In addition to these three signals the Y, I, Q matrix 66 also receives as input the blanking pulse BL 58, a sync pulse SY 70 and a burst flag pulse BF 72, generated by the synchronization components. The blanking pulse 58 is branched at a first branch junction 68 from the blanking pulse BF58 delivered to the input amplifier/-clamp 46.

A group of system generated signals 34 also serve as inputs to the Y, I, Q matrix 66. These include a sync level signal SL 74, a burst level signal BV 76, a luminance level signal YL 78 and a burst phase signal BP 80. The sync level signal 74 and the burst level signal 76 are in the range mAmps and are internally tweaked or adjusted by the factory or the technical personnel utilizing the internal potentiometer controls 22 in order to achieve the desired shaping and level of output. The burst phase input 80 is utilized to conform the phase of the I & Q signals particularly and is also adjusted by the internal potentiometer controls 22. The luminance level input 78 is in the range of 0–12 volts and is user adjusted by of the potentiometer control knobs 20 appearing the housing 12 in order to provide the proper luminance output.

The Y,I,Q matrix 66 is a composite of three differential amplifiers with a resistive matrix which is utilized to convert the R+, G+ and B+ signals 60, 62 and 64 into the conventional color composite signals in the nature of a luminance signal Y 82 an I chrominance signal 84 and a Q chrominance signal 86 which are the output of the Y,I,Q matrix 66. These three output signals are conventionally generated as combinations of the incoming R+. G+ and B+ signals 60, 62 and 64 according to established industry ratios. According to industry standard, and as utilized in the color encoding system 10 the luminance signal Y 82 is derived as +0.30 R+, +0.59 G+ and +0.11 B+. The Y signal 82 corresponds to the black and white intensity of the video signal.

The I chrominance signal 84 is one of the two conventional chrominance or color component signals which is standard in the industry. The I chrominance signal 84 is comprised of +0.60 R+, −0.28 G+. and −0.32 B+. Similarly, the Q chrominance signal 86, the other conventional chrominance component signal, is comprised of +0.21 R+, −0.52 G+, and +0.31 B+. The Y, I, and Q signals 82, 84 and 86 generated in the Y, I, Q matrix 66 are then delivered over separate conductive pathways 38 to an additional signal modification element 36 in the form of a CTI delay 88. The CTI delay 88 is in the nature of a chroma transient improvement component including two color differential amplifiers whose rise time is controlled by the rise time of the Y signal 82. The CTI delay component is utilized to insure that the transient edges of the I and Q signals 84 and 86 are aligned, thereby eliminating any color fringe in the video output The delay section of the CTI delay matches the chrominance path length of the I and Q signals 84 and 86 to the path length of the Y signal 82 An additional system generated input signal 34 in the form of a Y/C delay input 90 is also provided from the potentiometer array, as adjusted by the internal potentiometer controls 22, in order to achieve the delay factor.

The output of the CTI delay 88 is in the form of a delayed I signal I' 92 a the delayed Q signal Q' 94. The unaltered Y signal 78 is also a output of the CTI delay 88.

The delayed I signal I' 92 and the delayed Q signal Q' 94 are then delivered, still over separate conductive pathways 38, to an I, Q modulator 96. The internal components of the I, Q modulator 96 are discussed in more detail hereinafter with respect to FIG. 3. The I, Q modulator 96 is utilized to modulate and shape the I' and Q' signals 92 and 94 to provide chrominance signal on a single carrier.

A group of additional system-generated input signals 34 are also delivered to the I, Q modulator 96 These signals are in the nature of an I gain signal IG 98 an I balance signal IB 100, a Q gain signal QG 102 and a Q balance signal QB 104. The I gain signal 98 and the Q gain signal 102 are current signals in the range of 0–14 mAmps and are controlled within this range by the user via the potentiometer control knobs 20 on the housing 12 which correspond to Q gain and I gain. The I balance signal 100 and the Q balance signal 104 are voltage signals which are adjusted utilizing the internal potentiometer controls 22 by the factory or technicians in order to achieve properly balanced output for the particular components chosen.

The I,Q modulator 96 also receives as inputs a pair of phase shifted frequency carriers in the nature of a quadrupled carrier 0 degrees signal $4f_{sc}0$ 106 and a 90 degrees offset quadrupled carrier $4f_{sc}90$ 108, both of which are generated by the synchronization components. The resulting output of the I, Q modulator 96 is in the form of a quadrupled chrominance signal $C_4$ 110 which is delivered to a second branching junction 112 and split into three components.

Figure 3:
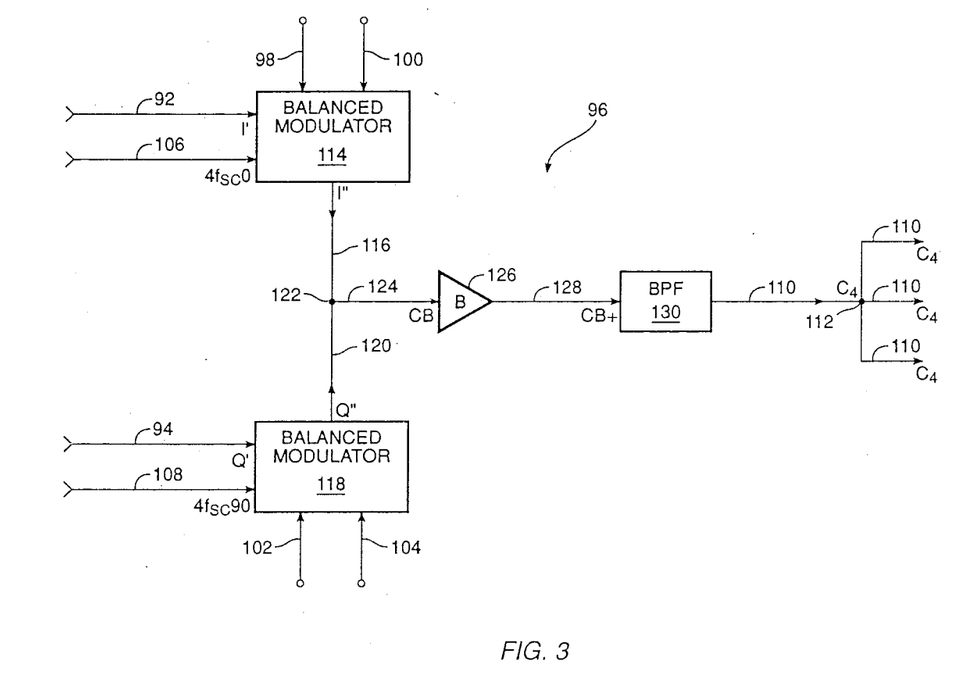
FIG. 3 is a schematic illustration of the I,Q modulator component of the preferred embodiment.

The specific structure of the IQ modulator device 96 is illustrated in schematic fashion in FIG. 3. In this illustration it may be seen that the delayed I signal I' 92 is delivered to a first balanced modulator 114 where it is combined with the quad carrier 90 $4f_{sc}90$ 108, the I gain signal IG 98 and the I balance signal IB 100 The first balance modulator 114 provides amplitude modulation and suppression of the carrier while combining the chrominance information of the I' signal 92 with the quad carrier 90 108 which is at the relatively high frequency of four times NTSC standard. The high frequency insures that no cross interference occurs between the modulation information and the carrier. This operates to eliminate moving dots or chroma shimmer in the final video picture The output of the first balanced modulator is a balanced I signal I" 116.

Similarly, the delayed Q signal 94 is delivered to a second balanced modulator 118 substantially similar to the first balanced modulator 114. In the second balanced modulator 118 the delayed Q signal Q' 94 is combined with the zero degree offset quad carrier 106, the Q gain signal QG 102 and the Q balance signal QB 104. The output of the second balance modulator 118 is a balanced Q signal Q" 120.

The balanced I signal I" 116 and the balanced Q signal Q" 120 are carried along separate conductive pathways 38 to a third pathway junction 122. At the third pathway junction 122 the signals combine into a balanced chroma signal CB 124. It is feasible to combine the balanced I signal I" 116 and the balanced Q signal Q" 120 into the single balanced chroma signal CB 124 since the carriers for the I and Q components are offset by ninety degrees of phase. This prevents interference between the I and Q components and allows the entire I and Q chrominance information to be carried in the same signal, the balanced chromisignal CB 124.

The balanced chroma signal 124 is then delivered to a first buffer amplifier 126. As will be the case for the other buffer amplifiers to be described herein, the first buffer amplifier 126 has a high input impedance of approximately 10,000 Ohms and a medium output impedance of approximately 500 Ohms. The buffer amplifiers are also one-way signal flow components and thus act as the equivalent of check valves to prevent undesirable signal mixing. The output of the first buffer amplifier is an amplified CB signal CB+ 128.

The amplified CB signal 128, still at a primary carrier frequency of 14.318 MHz, but also including various extraneous frequencies which may have been part of the original R, G, and B signals or of the various additional system inputs, is delivered to a first band pass filter 130. The purpose of the first band pass filter 130 is to eliminate extraneous frequencies from the signal and to allow only those portions of the signal falling within a narrow frequency range to pass through. In the case of the first band pass filter 130 the center frequency is 14.318 MHz and the permissible band width is + or −750 KHz. Accordingly, the output of the first band pass filter includes only those portions of the signal which are carried on the quad carriers 106 and 108 (14.318 MHz) and eliminates all extraneous frequencies. The output of the first band pass filter is the quad chrominance signal $C_4$ 110 discussed above.

As also discussed above, the quad chrominance signal $C_4$ 110 is carried from the first band pass filter 130 to the second junction 112 where it is split into three signal components which will be discussed hereinafter with respect to FIG. 2b.

Figure 4:
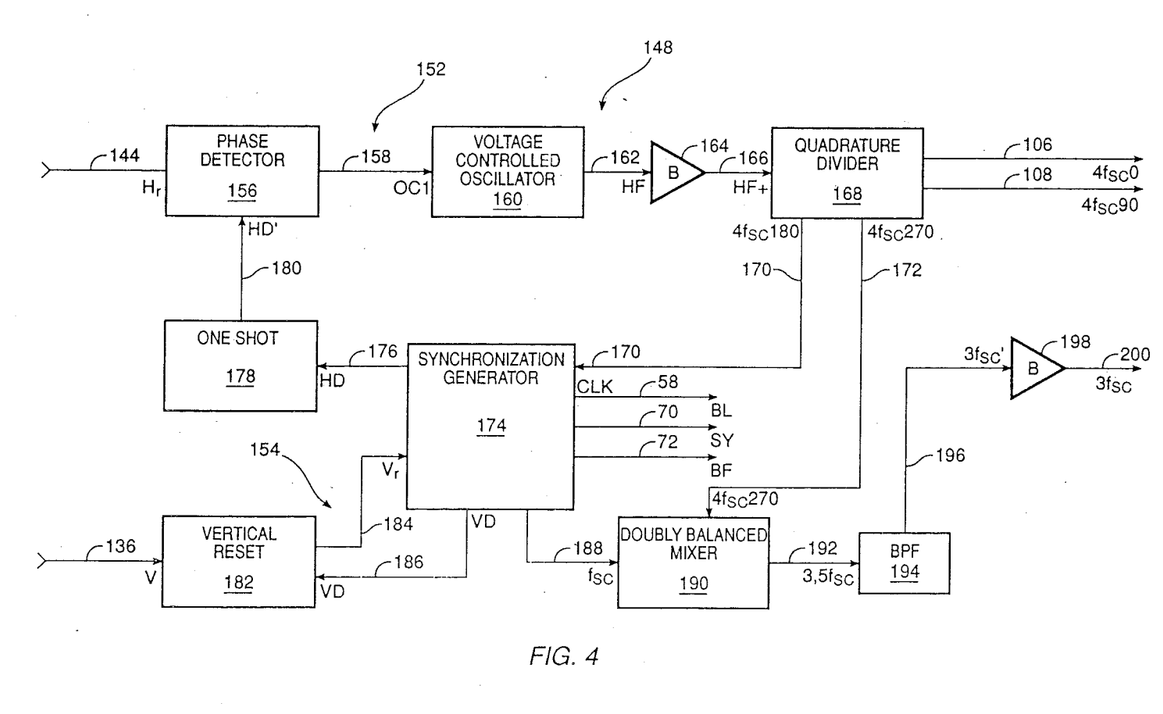
FIG. 4 is a schematic illustration of the sync generation subcircuit component of the preferred embodiment.
Figure 5:
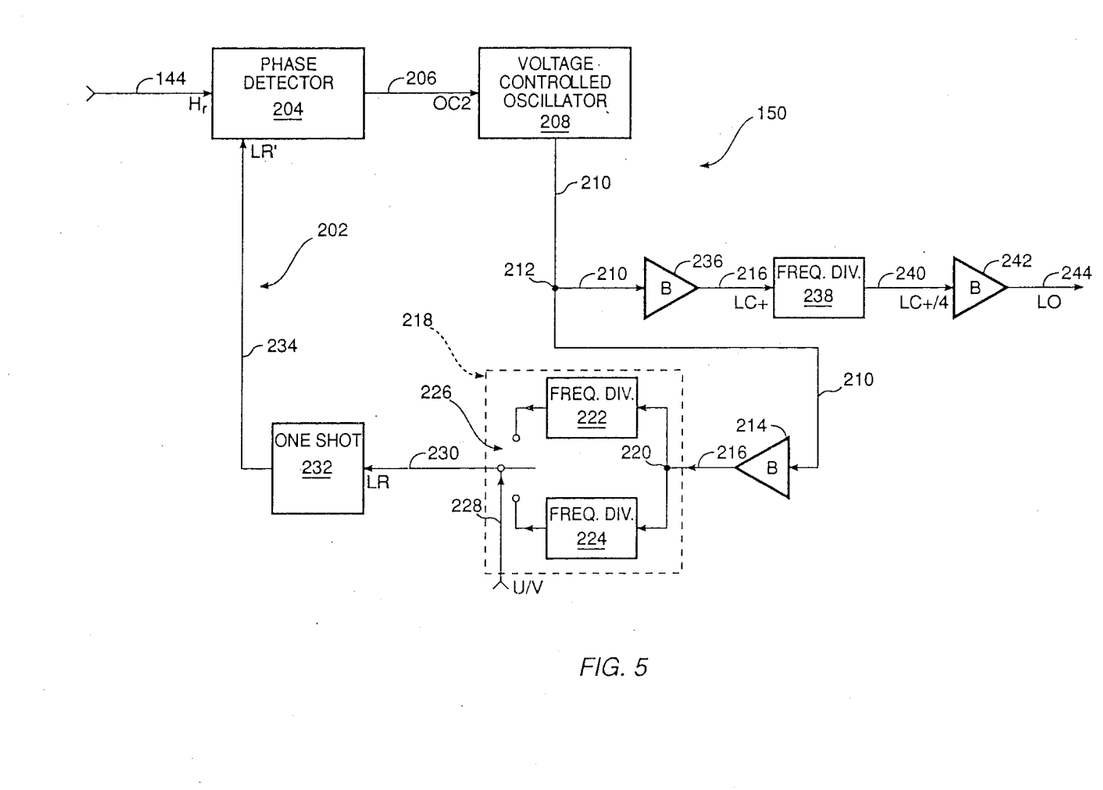
FIG. 5 is a schematic illustration of the local oscillator sync generation subcircuit component of the preferred embodiment.

In order to complete the discussion with relation to FIG. 2a, it is now necessary to consider the synchronization signal generation components of the operational circuit 30 These components are illustrated in FIGS. 2a, 4 and 5. The only external input signal 32 which is delivered to the synchronization generation components is in the form of a house composite sync input 132. The house composite sync signal 132 is delivered to the color encoding system 10 through one of the input ports 26 and is either generated by the end user device, such as a VCR or television device or is separately generated within the studio or user's facility by a synchronization signal generator.

The house composite sync input 132 is delivered to a synchronization separator 134 where it is separated into its individual components. The three synchronization components which are of significance to the color encoding system 10 are a vertical synchronization pulse V 136, a horizontal synchronization pulse H 138 and a field ID sync F 140. The field ID signal 140, also known as a drum signal, is utilized, particularly in VHS and SVHS video tape equipment to determine the video head phase relative to the video signal. The field ID signal 140 is a nearly direct output and will be discussed further with respect to FIG. 2b.

The horizontal sync pulse H 138 at a frequency of approximately 15.7 KHz is delivered to a first one shot 142 which is in the nature of a timer device which operates on the horizontal sync pulse H 138 by taking the asymmetrical pulse and shaping it into a symmetrical square wave by adjusting the timing of the positive and negative components to be equal. The output of the first one shot 142 is a horizontal reference signal $H_r$ 144.

From the first one shot 142 the horizontal reference $H_r$ 144 proceeds to a fourth pathway junction 146 where it branches to two components. From the fourth junction 146 the horizontal reference pulse 144 is delivered to a primary sync generation subcircuit 148 and a local oscillator (LO) sync generator subcircuit 150. The primary sync generation subcircuit 148 is illustrated in schematic detail in FIG. 4 while the LO generator subcircuit 150 is similarly illustrated in FIG. 5.

Referring now to FIG. 4, the primary sync generation subcircuit 148 is illustrated in schematic fashion. In this illustration it may be seen that the only inputs to the sync generation subcircuit 148 are the vertical sync pulse 136 the horizontal reference pulse 144. These internal signals 42 are delivered to the sync generation subcircuit 148 which includes subcomponents in the nature of phase locked loop subcircuits which assure that the frequency and phase of the outputs therefrom are very finely controlled. The sync generator subcircuit 148 may be thought of as including a horizontal loop subcomponent 152 and a vertical loop subcomponent 154.

Considering first the horizontal loop subcomponent 152, it may be seen that the horizontal reference $H_r$ 144, as generated within the first one shot 142, is delivered to a first phase detector 156. The first phase detector 156 locks the phase of the horizontal reference $H_r$ 144 signal by comparing it with an additional signal as will be discussed. Based upon such comparison the first phase detector 156 delivers. A first oscillator control signal OC1 158 to a first voltage controlled oscillator (VCOl) 160. The OC1 signal 158 is a variable voltage signal utilized to adjust the oscillation frequency of the first voltage controlled oscillator 160 to the desired level.

The first voltage controlled oscillator ("VCO") 160 is utilized for the primary frequency generation which is referenced to the horizontal sync signal 138 derived from the house composite sync 132. The first VCO 160 is precisely at a frequency of 57,272,727.16 Hz or 57.27 MHz. If this frequency is not achieved the horizontal loop 152 will tend to unbalance and the OC1 signal 158 will be adjusted by the first phase detector 156 until the proper frequency of oscillation obtains.

The output of the first VCO 160 is at a frequency of 57.27 MHz and is in the form of a high frequency square wave 162. The HF signal 162 is then delivered to a second buffer amplifier 164 where it is amplified to produce an amplified high frequency reference wave HF+ 166.

The amplified high frequency reference HR+ 166 is then delivered to a quadrature divider 168. The quadrature divider 168 is a precision divider element which precisely divides the high frequency reference HR+ 166 into four output signals, each at 14.32 MHz, offset from each other by phase. In this case, each of the four output signals of the quadrature divider 168 are offset by ninety degrees of phase such that there is no mutual interference between perpendicularly phased signals. Of course, if signals which are 180 degrees offset from each other are combined they will cancel. Two of these signals have been previously discussed, these being the quad carrier 0 $4f_{sc}$ 0 106 and the quad carrier 90 $4f_{sc}$ 90 108 which are delivered to the IQ modulator 96. A third output is a 180 degrees of offset quad carrier 180 $4f_{sc}$180 170 which remains within the horizontal loop 152 and is also known as the clock signal CLK 170. The fourth output signal from the quadrature divider 168 is a 270 degrees offset quad carrier 270 4f$_{sc}$270 172 which will be discussed hereinafter.

The clock signal CLK 170 continues within the horizontal loop 152 to a synchronization generator 174. The sync generator 174 is a complex frequency generation component which will be discussed in more detail hereinafter, but includes a horizontal drive pulse 176 which continues within the horizontal loop 152. The horizontal drive pulse HD 176 is delivered to a second shot 178 which modifies the horizontal drive HD signal 176 to produce a square wave signal referred to as a modified horizontal drive HD' 180. The horizontal loop 152 is then completed by delivering the modified horizontal drive signal HD' 180 back to the first phase detector 156, where the phase is compare with the horizontal reference signal H$_r$ 144, as discussed above, and the OC1 signal 158 is altered if necessary.

The vertical loop 154 is much simpler in structure. In the vertical loop 154 the vertical sync pulse 136 is delivered to a vertical reset component 182 The vertical reset 182 generates as output a vertical reset signal V$_r$ 184 which is delivered to the sync generator 174. The sync generator 174 outputs a vertical drive signal 186 which completes the vertical loop 154 by being delivered back to the vertical reset 182 The vertical reset 182 compares the vertical drive signal 186 with the vertical sync pulse 136 ultimately generated by the user's devices. If the signals do not match then the vertical reset signal V$_r$ 184 delivered to the sync generator 174 resets the internal counters of the sync generator 174 until a match is achieved and the phase is appropriately locked.

Returning now to the consideration of the sync generator 174, this component is in the nature of a an array of counter elements, adaptable to be reset to zero by the vertical reset signal 184. These counter elements act upon frequency pulse inputs to generate a multiplicity of internal signals 42 which are utilized by various signal modification components 36. The sync generator 174 receives as inputs only the clock pulse 170 and the vertical reset pulse 184 (which serves only to reset the counters when the phase lock is reset). The sync generator 174 acts upon the clock pulse 174 by using the counter array to modify and divide the clock pulse signal 174 in order to provide a variety of output pulses, some of which have been discussed previously. These include the blanking pulse 58 which is in the nature of a 15.73 KHz square wave pulse having a pulse duration of about 11 microseconds, the burst flag signal 70, which is in the nature of a 15.73 KHz square wave pulse having a pulse duration of about 1 microsecond, and the sync pulse 72 which is in the nature of a 15.73 KHz square wave pulse having a pulse duration of about 4 microseconds. Additional, previously discussed, internal signals 42 which are generated by the sync generator 174 are the horizontal drive pulse HD 176 and the vertical drive pulse VD 186.

The final internal signal 42 generated by the sync generator 174 is in the nature of an NTSC standard carrier f$_{sc}$ 188. The NTSC carrier f$_{sc}$ 188 is a frequency pulse at the standard NTSC frequency of 3,579,545.4545 Hz, generally known as 3.58 MHz. This frequency is the frequency which has been established by U.S. national standards as the frequency at which chrominance signals are output to video devices and, in the preferred operational circuitry 30, is one fourth the frequency of the clock pulse CL 174.

Within the sync generation subcircuit 148 the NTSC standard carrier 188 is delivered to a first doubly balanced mixer 190 The first doubly ha lanced mixer 190 also receives as input the quadcarrier 270 signal 172 from the quadrature divider 168. The first doubly balanced mixer 190 is in the nature of signal frequency combination component which has the effect of combining the incoming signals in a manner such that the output is a combined signal with one component having a frequency of the sum of the incoming signals while the other component is at a frequency equal to the difference between the incoming signals In the case of the first doubly balanced mixer 190 the output is in the form of a mixed 3, 5 carrier 3, 5f$_{sc}$ 192 including synchronization pulse components having a frequency of 10.74 MHz and 17.85 MHz.

From the first doubly balanced mixer 190 the mixed 3, 5 carrier 192 is delivered to a second band pass filter 194. The second band pass filter 194 has a center frequency 10.7 MHz and a vary narrow band width of + or −20 KHz. The second band pass filter 194 filters out extraneous frequencies and passes as an output only a weak tripled carrier 3f$_{sc}$' having a frequency of 10.74 MHz.

The weak tripled carrier 196 is then delivered to a third buffer amplifier 198 which amplifies the signal to produce as an output a tripled carrier 3f$_{sc}$ 200.

Referring now to FIG. 5, the structure of the local oscillator ("LO") subcircuit 150 is illustrated in a more detailed schematic fashion. From the structure illustrated in FIG. 5 it may be seen that the local oscillator subcircuit 150 is a frequency generation array similar in nature to the sync generation subcircuit 148 and that a portion thereof is a phase lock loop. The local oscillator subcircuit 150 utilizes a LO loop 202 in order to lock the phase of the output signal. Many of the components of the LO loop 202 are similar to those of the horizontal loop subcomponent 152 illustrated in FIG. 4.

The input signal to the LO generator subcircuit 150 is the horizontal reference H$_r$ signal 144, as is the case with the sync generation subcircuit 148. The horizontal reference signal 144 is delivered to a second phase detector 204. The second phase detector 204 operates in a manner similar to the first phase detector 156 and generates as its output a second oscillator control pulse OC2 206. The second oscillator control pulse 206 is utilized as a voltage signal to control the frequency of oscillation of a second voltage controlled oscillator 208. The second voltage controlled oscillator 208 is similar in structure to the first voltage control oscillator 160 in that its precise frequency of oscillation is determined by the voltage signal delivered as the second oscillator control signal 206, but a difference in the frequency involved The second voltage controlled oscillator 208 is adapted to oscillate in the frequency range surrounding 54 MHz and, dependent on the signal received as result of the remainder of the LO loop subcomponent 202, will ordinary oscillate at b 54.51923065 MHz or 54.755244.64 MHz. The output of the second voltage controlled oscillator 208 will be at one of these two frequencies and will be in nature of a local oscillator carrier LC 210.

From the second voltage controlled oscillator 208 the local oscillator carrier LC 210 is delivered to a fifth pathway junction 212 where it is split into two branches with one of the branches being delivered to a fourth buffer amplifier 214. The fourth buffer amplifier 214, which is arrayed within the LO loop subcomponent 202, amplifies the local oscillator carrier 210 to produce an amplified signal LC+ 216. The amplified LC signal LC+ 216 is then delivered to a U/V switch subassembly 218. The U/V switch subassembly 218 is a user selectable switch which permits user to determine whether the output of the local oscillator subassembly 150 is suitable for use with U-matic standard or VHS standard video equipment.

As is shown in FIG. 5, the amplified LC signal LC+ 216 is delivered within the U/V switch 218 to a sixth pathway junction 220. The branches from the sixth pathway junction 220 are delivered either to a first frequency divider 222 or a second frequency divider 224 The first frequency divider 222 and the second frequency divider 224 are counter based components which are utilized to produce a frequency output signal which is obtained by dividing the frequency of the input by a preselected constant value in order to obtain the desired output. In the case of the first frequency divider 222, the constant utilized for division is 3,465. This number is selected in order to yield a result of 15.73 KHz when the incoming frequency from the second voltage control oscillator 208 is at a frequency of 54.52 MHz. Similarly, the second voltage divider 224 has a division constant of 3,480 in order to obtain the same 15.73 KHz output when the input signal frequency of the amplified LC signal 216 is 54.76 MHz.

The selection between the first frequency divider 22 and the second frequency divider 224 is made by way of a toggle switch 226, the position of which is controlled by a U/V select signal 228 generated by the LO switch 24 situated the system housing 12. The user will make this selection depending on the type of output desired.

Because of the self balancing nature of the LO loop subcomponent 202, the output of the U/V switch subassembly 218 is independent of the position of the U/V toggle switch 226. In either switch position once a steady state has been achieved, the output will be in the form of a 15.73 KHz signal known as a low reference signal LR 230. The low reference signal LR 230 is then delivered to third one shot 232 which generates as its output symmetrical square wave referred to as a squared low reference signal LR' 234 which is then delivered back to the second phase detector 204. When the LO loop subcomponent 202 is in a steady state the squared LO reference signal LR' 23 and the incoming horizontal reference signal $H_r$ 144 will match exactly as to frequency and phase and the second oscillator control signal 206 generated by the second phase detector 204 will cause the second voltage controlled oscillator 208 to oscillate at the frequency corresponding to the appropriate setting of the U/V switch 24.

As the result of the operation of the LO loop components 202, the local oscillator carrier LC 210 output by the second voltage controlled oscillator 208 will be either at 54.52 MHz or 54.76 MHz. Therefore, the signal delivered to the fifth junction 212 will be at one of these two frequencies. The branch component of the local oscillator carrier LC 210 is then delivered to a fifth buffer amplifier 236. Just as in the case of the fourth buffer amplifier 214 the output of the fifth buffer amplifier 236 is an amplified local oscillator carrier 216. From the fifth buffer amplifier 236 this signal is delivered to a third frequency divider 238.

The third frequency divider 238 is similar in nature to the first and second frequency dividers 222 and 224 and is selected to have a division constant of four. As a result, the output of the third frequency divider 238 will be a quartered LC+ signal LC+/4 at a frequency of 13.63 MHz or is then delivered to 13.68 Hz depending upon the position of the U/V switch 24. The quartered LC+ signal LC+/4 240 is then delivered to a sixth buffer amplifier 242 where the voltage of the signal is amplified to create an amplified local oscillator signal which is referred to as the LO signal 244. Depending upon the position of the LO U/V switch 24, the frequency of the LO signal 244 will be either 13.63 MHz or 13.68 MHz. The LO signal 244 is the only output of the local oscillator subcircuit 150 and its utilization within the remainder of the operational circuitry 30 will discussed hereinafter with respect to FIG. 2b.

Referring now to FIG. 2b the remainder of the operational circuitry 30 is illustrated in schematic fashion, showing the manner in which the operational circuit 30 continues to process the internal signals 42 generated in the components shown in FIG. 2a in order to produce the of output signals 44.

The first signal to be considered is the luminance signal Y 82 which is delivered to a signal modification component 36 in the nature of a dynamic aperture 246. The dynamic aperture 246 also receives as inputs the blanking signal BL 58 and a system generated equalization signal 248. The dynamic aperture 246 is primarily an array of Schmidt triggers which operate on the Y signal, typically in the form of a sine wave, by effectively decreasing the rise time of the Y signal and causing it to more closely approximate a square wave. The dynamic aperture 246 accomplishes this purpose without altering the effective pathlength. The net output of the dynamic aperture 246 is in the form of a squared luminance signal Y' 250.

The desirability of approximating a square wave in the squared luminance signal Y' 250 is that this maximizes the fine detail and high resolution performance. The utilization of the dynamic aperture 246 within the preferred embodiment 10 is one of the reasons for its superior performance.

The squared luminance signal Y' 250 is then delivered to a gated amplifier 252. The gated amplifier 252 is selected to have a high input impedance of approximately 10,000 ohms and a medium output impedance of approximately 500 ohms. The amount of gain within the gated amplifier 252 is controlled by a gate pulse.

In the case of the gated amplifier 25 the gate pulse is derived from the quad chrominance signal $C_4$ 110. As is shown in FIG. 2b, the quad chrominance signal $C_4$ 110 is delivered to a seventh buffer amplifier 254 which outputs an amplified quad chrominance signal $C_4+$ 256 which operates as the gate pulse for the gated amplifier 252.

The manner in which the gated amplifier 252 operates in the present invention 10 is that a high value quad chrominance signal $C_4+$ 256 causes a substantial reduction in the gain provided by the gated amplifier 252. The purpose of this gain reduction is to effectively chop the luminance signal when there is a particularly high rate of change in the value of the chrominance signal. This chopping which is of a very short duration, acts to eliminate deleterious signal edge effects which may be caused by coincidence of chroma-envelope with the luma-input. If the edge interference is not eliminated it is possible to get a crawling edge effect on the video screen due to crosstalking between the luminance components of the output and the chrominance components of the output.

The output of the gated amplifier 252 is in the nature of a chopped luminance signal Y" 258 which is then delivered to a seventh junction 260. One branch of the chopped luminance Y" 258 is then delivered to a first driver amplifier 262. The first driver amplifier 262, and each of the other driver amplifiers to be found within the operational circuitry 30, is selected to have a high input impedance of approximately 10,000 ohms and a very low output impedance of approximately 6 ohms.

The output of the first driver amplifier 262 is the luminance output signal $Y_x$ 264. The luminance output $Y_x$ 264 is in the nature of a shaped and modified luminance signal which is appropriate for direct use by various output devices. In the case of output to a black and white video deice the luminance output $Y_x$ is the only video signal required. It is noted that the frequency of the luminance output $Y_x$ 264 is unaltered from that of the original luminance signal 82 generated by the Y,I,Q matrix 66 with the only significant alterations in the nature of the signal occurring from the shaping operations of the dynamic aperture 246 and the gated amplifier 252. The standard power level of the luminance output $Y_x$ 264 is 1Vpp (one volt peak to peak).

Turning now to the subject of chrominance signal processing, it may be seen in FIG. 2b that another branch of the quad chrominance signal $C_4$ is delivered to a eighth buffer amplifier 265. The eighth buffer amplifier 265 creates an additional amplified quad chrominance signal $C_4$ +256 which is then delivered to a second doubly balanced mixer 266. The additional input to the second doubly balanced mixer 266 is the tripled carrier $3f_{sc}$ 200 generated within the sync generation subcircuit 148. The output of the second doubly balanced mixer 266 is mixed 1, 7 chrominance 1, 7C 268. The mixed 1, 7 chrominance 1, 7C signal 268 includes carrier frequencies equal to the NTSC carrier frequency of 3.58 MHz (4 NTSC - 3 NTSC) and at 7 times the NTSC carrier frequency or 25.06 MHz (4 NTSC+3 NTSC).

The mixed 1, 7 chrominance signal 1,7C 268 is then delivered to a third band pass filter 270. The third band pass filter 270 has a center frequency of 3.58 MHz and a band width of + or −750 KHz. The third band pass filter 270 filters out the 7 NTSC frequency components and other harmonics outside of the band width and delivers only an NTSC chrominance signal CN 272 as its output. The third band pass filter 270 could also have substituted therefore a low pass filter (not shown), since the frequency components desired to be blocked are all of frequencies high that 3.58 MHz. The band pass filter 270 does, however, deliver a somewhat cleaner signal since spurious signals of a lower frequency are also eliminated thereby.

The NTSC chrominance signal CN 272 is then delivered to a ninth junction 274 where it is branched into two components with one of the components proceeding to a ninth buffer amplifier 276 which amplifies the signal to provide an amplified NTSC chrominance signal CN+ 278. The amplified NTSC chrominance signal CN+ 278 is then delivered to a second driver amplifier 280 which produces as its output a conventional NTSC chrominance output signal $CN_x$ 282. This signal is on a carrier of 3.58 MHz and has a 285 mVpp burst power level. The NTSC chrominance output $CN_x$ 282 is usable particularly those which utilize separate luminance and chrominance inputs. These Y/C input devices will operate properly utilizing as their inputs the luminance output $Y_x$ 264 and the NTSC chrominance output $CN_x$ 282. These two signals will be combined within the appropriate device for provision of a complete video signal.

For devices which utilize only a single input combining the luminance and chrominance signals into what is commonly referred to as a composite video signal, such as most conventional television sets, it is desirable to produce such a combined output. In the present invention of a color encoding system 10, the operational circuitry 30 includes components and pathways to accomplish this purpose. As is illustrated in FIG. 2b, a further branch of the NTSC chrominance signal CN 272 from the ninth junction 274 is delivered to a tenth buffer amplifier 284 which outputs an additional amplified NTSC chrominance signal CN+ 278. This signal is then delivered to an adder component 286, shown in FIG. 2b as contained within a dotted line.

Additional input to the adder component 286 is provided by an additional branch of the chopped luminance signal Y" 258 from the seventh junction 260. The chopped luminance signal Y" 258 is delivered to an eleventh buffer amplifier 288 to provide an amplified chopped luminance Y"+ 289. The amplified chopped luminance Y"+ 289 is delivered to the adder component 286, where it is added to the amplified NTSC chrominance signal CN+ 278. The structure of the adder component 286 is simple in nature and includes a first resistor 290 on the chrominance line and a second resistor 292 on the luminance line. The first resistor 290 and the second resistor 292 act to isolate the signals for addition with avoidance of interference. The chrominance and luminance signals are then added to each other at a tenth junction 294 to produce a composite video signal 296. The composite video signal 296 is then delivered to a third driver amplifier 298 which amplifies the signal to produce a composite video output $CV_x$ 300. The composite video output $CV_x$ 300 includes both the luminance information and the chrominance information and is adaptable for usage by standard composite video devices such as ordinary color television sets. The composite video output $CV_x$ has a pulse power level of $V_{pp}$, the same as the separate luminance output $Y_x$ 264.

Certain types of video devices require that the chrominance signal be delivered on a frequency other than NTSC standard carrier. Included among these devices are U-matic standard devices which require an output at 688.37 KHz and VHS devices which require an output at 629.370 KHz. The color encoding system 10 is also adapted to provide outputs to these types of devices.

In order to provide such outputs the final branch of the quad chrominance signal $C_4$ 110 is delivered to a twelfth buffer amplifier 302 to produce an additional amplified quad chrominance signal $C_4$+ 256 which is delivered to a third doubly balanced mixer 304.

The additional input to the third doubly balanced mixer 304 is the local oscillator signal LO 244. As discussed above, depending upon the setting of the U/V switch 24, the local oscillator signal LO 244 will either be at a frequency of 13.63 MHz or 13.68 MHz. The output of the third doubly balanced mixer 304 is therefore in the form of the sum and the difference of the incoming frequencies and depending upon the setting of U/V switch 24 will be at frequency pairs of 27.95 MHz and 688.37 KHz for U-matic and 28.00 MHz and 629.37 KHz for VHS.

The output of the third doubly balanced mixer 304 referred to as a mixed chroma-LO signal MCL 306 is then delivered to a low pass filter 308. The low pass filter 308 selected for the preferred operational circuitry 30 has a cut off frequency of 1.28 MHz. The net effect of the low pass filter 308 is to eliminate the high frequency carrier components and to produce a chrominance-LO signal CLO 310 at a frequency of either 688 KHz or 629 KHz.

The chrominance-LO signal CLO 310 is then delivered to a thirteenth buffer amplifier 312 which outputs an amplified chroma-LO signal CLO+ 314 and delivers it to a fourth driver amplifier 316. The output of the fourth driver amplifier 316 is a chroma-LO output $CLO_x$ 318 which includes all of the chrominance information on a selected carrier of 688 MHz or 629 MHz as selected by the user. The burst power level of the $CLO_x$ signal 318 is 285 mVpp. Within the appropriate video device this chroma-LO output signal $CLO_x$ 318 is combined with the luminance output $Y_x$ 264 to regenerate the complete video signal.

The final output of the operational circuitry 30 is in the form of a field ID signal which is derived from the field ID sync signal F 138 generated by the synchronization separator 134, as illustrated in FIG. 2a. To achieve this output the field ID sync signal F 140 is delivered to a fifth driver amplifier 320 which produces a field ID output $F_x$ 322. The field ID output $F_x$ 322 is a timing signal utilized by certain video tape systems, particularly VHS, and has a frequency of 30 Hz.

All of the outputs of the operational circuitry 30 are delivered to the output ports 28 of the color encoding system 10 for utilization by whatever variety of video equipment desired by the user. In this manner, the conversion of the R,G and B inputs 48, 50 and 52 is completed such that the video signals generated by a computer or other RGB type device may be utilized by conventional video devices.

The precise orientation of the various components 36 within the operational circuitry 30 may be substantially altered, as long as the operational structure remains the same, without degrading the quality of the resultant outputs. Furthermore, the values selected for the various signal modification elements 36 may be modified with a minimum of negative effects.

Those skilled in the art will readily observe that numerous other modifications of the high index coherent color encoding system 10 of the present invention and its individual components may be made while retaining the teachings of the invention. Accordingly, the above disclosure is not intended as limiting. The appended claims are therefore to be interpreted as encompassing the entire spirit and scope of the invention.

INDUSTRIAL APPLICABILITY

The industrial applicability of the high index coherent color encoding system 10 of the present invention will be clear to those skilled in the art from the above description. Substantial and widespread uses exist for a device capable of converting computer generated RGB output to standard video input.

Various envisioned uses include the generation of video graphics designed on personal computer devices and the preparation of computer generated video presentations. Even recreational and hobby type computer users will find utility in the present invention. For example, the device could be utilized to create a video record of a graphics adventure or arcade type computer game. This type of output could be utilized for further study of fast moving components within the game or for competition purposes.

A wide variety of other utilizations and adaptions of the present invention will no doubt be recognized by those skilled in the art and by potential users. The capability of converting RGB computer graphics output into video tape or color television signals will open plethora of possibilities. The requirement for dedicated computer monitors will no longer be absolute since a user may attach the computer to the color encoding system 10 and then output to preexisting devices having other primary uses.

From the above it may be seen that the high index coherent color encoding system 10 of the present invention is adaptable to a myriad quantity of available uses. It may therefore be expected that the present invention is likely to have extremely widespread industrial applicability and commercial utility.

I claim:

1. A color encoding system for RGB type video input information, comprising:

input means for receiving the RGB information; operational circuitry means for converting the RGB information into Y luminance signals and I and Q chrominance signals, and further for combining said I and Q signals to produce a first single chrominance signal on a common carrier frequency and a second single chrominance signal on a supplementary carrier frequency, and further for combining said Y luminance signal with said first single chrominance signal to provide a single composite video signal; and output means for delivering video output signals from the operational circuitry means to external devices;

wherein the operational circuitry means is characterized by modulating said chrominance signals at a substantially higher frequency than said common carrier frequency and then mixing and filtering said higher frequency to generate said first single chrominance signal on said common carrier frequency and said second chrominance signal on said supplementary carrier frequency.

2. The color encoding system of claim 1 wherein said common carrier frequency is selected to be the NTSC standard carrier and said higher frequency is four times said NTSC standard carrier.

3. The color encoding system of claim 1 wherein said mixing is accomplished by doubly balanced mixer components.

4. The color encoding system of claim 1, wherein said filtering is accomplished by band pass filters.

5. The color encoding system of claim 1 wherein said filtering is accomplished by a low pass filters.

6. The color encoding system of claim 1 wherein said Y luminance signal is shaped by dynamic aperture means for enhancing the rise slope of said Y luminance signal.

7. The color encoding system of claim 1 and further including power supply means for providing DC voltage to the operational circuitry;

a voltage level control array intermediate said power supply means and the operational circuitry for separating said DC voltage into component signals and for adjusting the levels of said component signals; and array adjustment means for selectively acting upon said voltage control array for performing said adjusting of said component signals.

8. The color encoding system of claim 7 wherein a housing is provided to enclose the system and at least a portion of said array adjustment means includes control members accessible from the exterior of said housing.

9. The color encoding system of claim 1 wherein
the operational circuitry receives as input in addition to said RGB information, a synchronization signal provided from external equipment and a variety of system generated input signal selectively created within the system; and said output video signals include a Y luminance output, a composite video output on an NTSC standard carrier frequency, a chrominance output on said NTSC standard carrier frequency, and a chrominance output a carrier frequency lower than said NTSC carrier frequency.

10. An operational circuitry assembly for encoding input in the form of separate Red (R), Green (G), and Blue (B) video component signals, comprising:

synchronization signal generation means for providing internal sync and carrier signals to selected components within the circuitry assembly;

a Y,I,Q matrix component for producing a Y luminance signal and I and Q chrominance component signals from the R,G, and B input signals;

an I,Q modulator component for producing a modulated I signal and a modulated Q signal by separately modulating said I and Q signals on to a relatively high first carrier frequency and for combining said modulated I and Q signals into a combined chrominance signal on a single carrier, said I and Q components being present in said combined chrominance signal in a perpendicular phase relationship;

a first frequency correction means for producing a first frequency corrected chrominance signal, said first frequency corrected chrominance signal comprising a second carrier frequency modulated by said I and Q components;

a second frequency correction means for producing a supplemental frequency corrected chrominance signal, supplemental frequency corrected chrominance signal comprising a supplemental carrier frequency modulated by said I and Q components;

adder means for adding said Y luminance signal to said first frequency corrected chrominance signal to produce a composite video signal; and output amplifier means for providing output signals derived from said Y luminance signal, said first frequency corrected chrominance signal, said supplemental frequency corrected chrominance signal and said composite video signal.

11. The operational circuitry assembly of claim 10 and further including a dynamic aperture component intermediate the Y,I,Q matrix component and the adder and output amplifier means for shaping said Y luminance signal by enhancing the rise slope such that said Y luminance signal approximates a square wave signal.

12. The operational circuitry assembly of claim 10 wherein said first frequency correction means includes doubly balanced mixer means for combining said combined chrominance signal with a reference frequency to produce a mixed chrominance signal having an additive component and a subtractive component; and filter means for selectively filtering out one of said additive and said subtractive components to provide said first frequency corrected chrominance signal at said second carrier frequency.

13. The operational circuitry assembly of claim 12 wherein said first carrier frequency is selected to be four times the NTSC standard carrier frequency;

said reference frequency is selected to be three times the NTSC standard carrier frequency; and said filter means filters out said additive component such that said second carrier frequency is equal to the NTSC standard carrier frequency.

14. The operational circuitry assembly of claim 12 wherein said second frequency correction means includes second doubly balanced mixer means for combining an additional branch of said combined chrominance signal with a second reference frequency to produce a second mixed chrominance signal, having additive and subtractive components; and second filter means for filtering out one of said additive and subtractive components to provide said supplemental frequency corrected chrominance signal on said supplemental carrier frequency.

15. The operational circuitry assembly of claim 14 wherein said first carrier frequency is selected to be four times the NTSC standard carrier frequency; said second reference frequency is selectable by a user controlled switch; and said filter means filters out said additive component such that said supplemental carrier frequency is, depending upon the position of said user controlled switch, equal to either a U-matic standard frequency or a VHS standard frequency.

16. The operational circuitry assembly of claim 10 and further including an input amplifier/clamp component for modifying the R,G, and B signals prior to delivery to the Y,I,Q matrix component; and a CTI delay component for delaying said I and Q chrominance component signals prior to delivery to the I,Q matrix component.

17. The operational circuitry assembly of claim 11 and further including gated amplifier means subsequent to said dynamic aperture component for chopping said Y luminance signal based upon additional input to said gated amplifier means in the form of said combined chrominance signal, said chopping acting to minimize deleterious edge effects which may be caused by coincidence of the Y luminance signal with the envelope of the chrominance signals.

18. In a color encoding system for encoding RGB color video inputs for output as video signals in other signal formats, the improvement comprising:

matrixing the separate R,G, and B input signals to provide a luminance component and two or more distinct chrominance components; modulating said chrominance components at a modulation carrier frequency substantially higher than a desired output carrier frequency;

reconstituting said chrominance components as a combined chrominance signal carried on said desired output carrier frequency; and additionally reconstituting said chrominance components as a combined chrominance signal carried on a supplemental carrier frequency.

19. The improvement of claim 18 wherein:

said modulation carrier frequency is selected to be four times the NTSC standard carrie frequency;
said desired output carrier frequency is selected to be said NTSC standard frequency; and
said supplemental carrie frequency is a frequency not evenly divisible into said modulation carrier frequency.

20. The improvement of claim 18 wherein
said luminance component is shaped to approximate a square wave by a dynamic aperture component.

* * * * *